(12) United States Patent
Chien et al.

(10) Patent No.: US 8,128,894 B2
(45) Date of Patent: Mar. 6, 2012

(54) GAS REACTION DEVICE HAVING FOUR REACTION STATES

(75) Inventors: Chun-Ching Chien, Taipei (TW); Shean-Du Chiou, Taoyuan County (TW); Su-Hsine Lin, Taoyuan County (TW); Wan-Min Huang, Taoyuan County (TW); Ning-Yih Hsu, Keelung (TW)

(73) Assignee: Atomic Energy Council, Taoyuan (TW)

(*) Notice: Subject to any disclaimer, the term of this patent is extended or adjusted under 35 U.S.C. 154(b) by 160 days.

(21) Appl. No.: 12/724,295

(22) Filed: Mar. 15, 2010

(65) Prior Publication Data

US 2011/0104011 A1 May 5, 2011

(30) Foreign Application Priority Data

Oct. 30, 2009 (TW) .................. 098136786

(51) Int. Cl.
*B01J 8/00* (2006.01)
*G01N 1/00* (2006.01)
*B01J 19/00* (2006.01)
*B01J 8/04* (2006.01)
*B01J 8/02* (2006.01)
*B01J 35/02* (2006.01)

(52) U.S. Cl. ........ 422/600; 422/119; 422/129; 422/187; 422/630; 422/639; 422/211

(58) Field of Classification Search .................. 422/119, 422/129, 187, 211, 600, 630, 639
See application file for complete search history.

(56) References Cited

U.S. PATENT DOCUMENTS 4,624,906 A * 11/1986 Kawamura et al. ............. 430/84
2006/0052647 A1 * 3/2006 Shikada et al. ............... 568/671

* cited by examiner

*Primary Examiner* — Walter D Griffin
*Assistant Examiner* — Natasha Young
(74) *Attorney, Agent, or Firm* — Lee & Hayes, PLLC

(57) ABSTRACT

The present disclosure provides a gas reaction device. Reactions are happened on a fixed bed and/or a slurry bed in four reaction states. Thus, by using the four reaction states, reactions are thoroughly completed with the same catalyst. Or, different reactions are completed with different catalysts for different purposes.

11 Claims, 1 Drawing Sheet

GAS REACTION DEVICE HAVING FOUR REACTION STATES

CROSS REFERENCE TO RELATED PATENT APPLICATIONS

Figure 1:
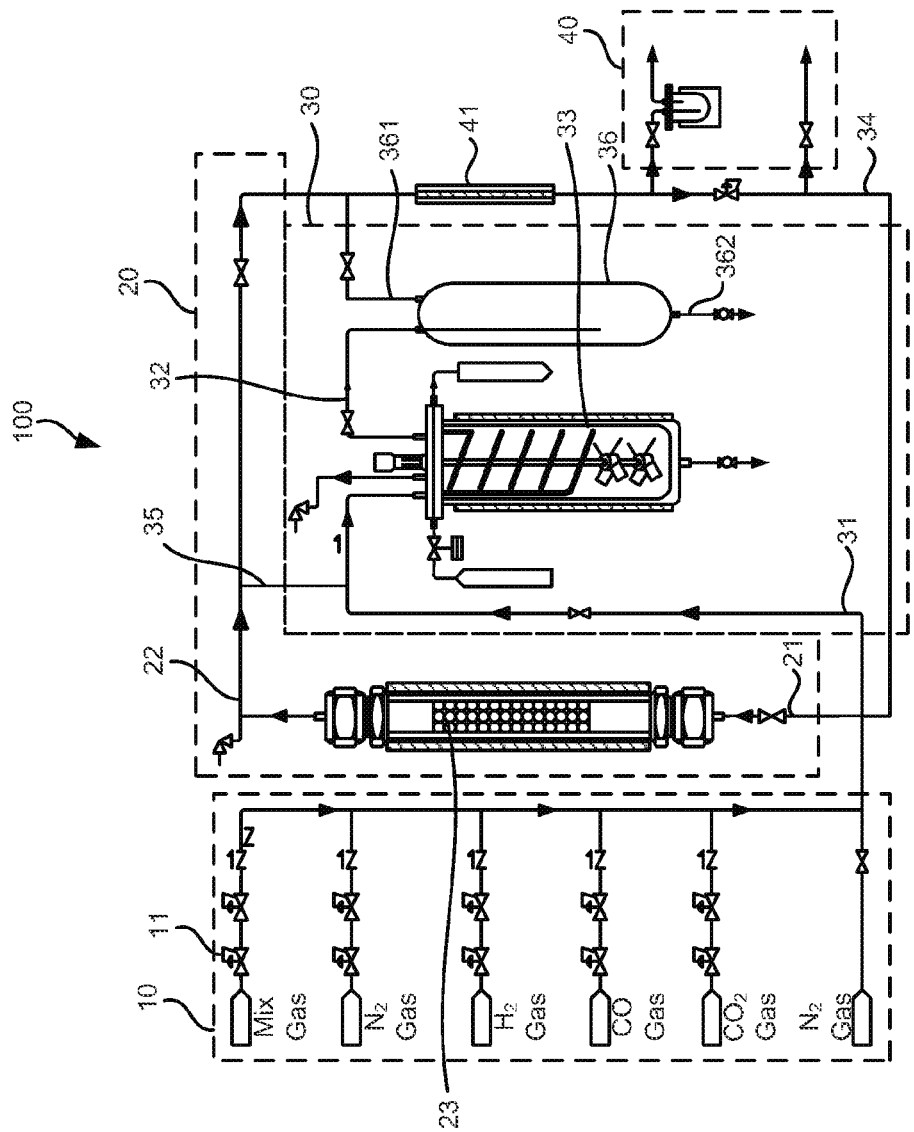

This application claims priority from Taiwan Patent Application No. 098136786, filed in the Taiwan Patent Office on Oct. 30, 2009, entitled "Gas Reaction Device Having Four Reaction States," and incorporates the Taiwan patent application in its entirety by reference.

TECHNICAL FIELD OF THE DISCLOSURE

The present disclosure relates to a gas reaction device; more particularly, relates to processing gas reactions on a fixed bed and/or a slurry bed in four reaction states.

DESCRIPTION OF THE RELATED ART

On designing a chemical reactor system, a difficult challenge is to ensure best physical contacts with reacting materials. A bad design may result in unwanted byproducts and unreacted materials that efficiency of whole system is impacted. Hence, reactor types, reacting materials, material diffusions, pressure effect and other conditions have to be considered on selecting or making a best system for selected reactions.

However, a traditional gas reaction device no matter with a fixed bed or a slurry bed is not all fit for different reactions with different catalysts, or for a thorough reaction with the same catalyst. On running a reaction with a few reacting gases, the catalysts and flows contained inside may make effect of the reaction lower than expected owing to incomplete mixture, which is not good to a chemical production technique. Hence, the prior art does not fulfill all users' requests on actual use.

SUMMARY OF THE DISCLOSURE

The main purpose of the present disclosure is to process gas reactions on a fixed bed and/or a slurry bed in four reaction states.

The second purpose of the present disclosure is, by using the four reaction states, to thoroughly complete gas reactions with the same catalyst, or, to complete different reactions with different catalysts for different purposes.

To achieve the above purposes, the present disclosure is a gas reaction device having four reaction states, comprising a plurality of gas transportation pipes; a fixed-bed reactor connected with the gas transportation pipes; a slurry-bed reactor connected with the gas transportation pipe; and a gas analyzer (GA) connected with the fixed-bed reactor and the slurry-bed reactor, where the plurality of gas transportation pipes are connected with each other; each of the gas transportation pipes has at least one valve to control inlet of a reacting gas; the fixed-bed reactor has a first gas inlet pipeline, a gas outlet pipeline and a catalyst bed contained inside; a fixed-bed reaction is happened with a fixed-bed catalyst and then a reacted gas is obtained after the fixed-bed reaction to be outlet through the gas outlet pipeline; the slurry-bed reactor comprises a second gas inlet pipeline, a gas/liquid outlet pipeline and a reaction housing; the second gas inlet pipeline is connected with the first gas inlet pipeline; the second gas inlet pipeline is connected with the gas outlet pipeline of the fixed-bed reactor through a first connecting pipeline and a second connecting pipeline; the gas/liquid outlet pipeline has a condenser; the condenser has an exhaust pipeline and a drain line; the exhaust pipeline is connected with the gas outlet pipeline; the slurry-bed reactor processes a slurry-bed reaction with a slurry-bed catalyst; a reacted gas having steam obtained after the slurry-bed reaction are outlet to the condenser to separate gas and water; the gas separated from the reacted gas is outlet through the gas outlet pipeline; the water separated from the reacted gas is recirculated to the slurry-bed reactor through the exhaust pipeline; the GA receives and analyzes gas from a sampling tube; the gas from the sampling tube are obtained after catalyst reaction in the fixed-bed reactor and/or the slurry-bed reactor; the gas reaction device has four reaction states; a first reaction state of the four reaction states has a path starting from the gas transportation pipe then passing through the fixed-bed reactor and ending at the GA; a second reaction state of the four reaction states has a path starting from the gas transportation pipe then passing through the slurry-bed reactor and ending at the GA; a third reaction state has a path starting from the gas transportation pipe then passing through the slurry-bed reactor then the fixed-bed reactor and ending at the GA; and a fourth reaction state has a path starting from the gas transportation pipe then passing through the fixed-bed reactor then the slurry-bed reactor and ending at the GA. Accordingly, a novel gas reaction device having four reaction states is obtained.

BRIEF DESCRIPTIONS OF THE DRAWINGS

The present disclosure will be better understood from the following detailed description of the preferred embodiment according to the present disclosure, taken in conjunction with the accompanying drawing, in which FIG. 1 is the structural view showing the preferred embodiment according to the present disclosure.

DESCRIPTION OF THE PREFERRED EMBODIMENT

The following description of the preferred embodiment is provided to understand the features and the structures of the present disclosure.

Please refer to FIG. 1, which is a structural view showing a preferred embodiment according to the present disclosure. As shown in the FIGURE, the present disclosure is a gas reaction device having four reaction states, comprising a gas transportation pipe 10, a fixed-bed reactor 20, a slurry-bed reactor 30 and a gas analyzer 40 (GA), where gas reactions are happened on a fixed bed and/or a slurry bed in four reaction states.

The gas transportation pipes 10 are used to provide related gases, where the gas transportation pipes 10 are connected with each other and each gas transportation pipe has at least one valve 11 controlling inlet of a reacting gas.

The fixed-bed reactor 20 is connected with the gas transportation pipe 10 and is a reactor of two-phase bed of solid and liquid catalysts, where the fixed-bed reactor 20 has a first gas inlet pipeline 21 and a gas outlet pipeline 22; the fixed-bed reactor 20 contains a catalyst bed 23; and a fixed-bed catalyst is put on the catalyst bed 23.

The slurry-bed reactor 30 is connected with the gas transportation pipe 10 and the fixed-bed reactor 20; and is a reactor of three-phase bed of solid, liquid and gas catalysts, where the slurry-bed reactor 30 comprises a second gas inlet pipeline 31, a gas/liquid outlet pipeline 32 and a reaction housing 33; the second gas inlet pipeline 31 is connected with the first gas inlet pipeline 21; the second gas inlet pipeline 31 is connected with the gas outlet pipeline 22 of the fixed-bed reactor 20 through a first connecting pipeline 34 and a second connecting pipeline 35; the gas/liquid outlet pipeline 32 is set with a condenser 36 having an exhaust pipeline 361 and a drain line 632; the exhaust pipeline 361 is connected with the gas outlet pipeline 22; the reaction housing 33 has a slurry-bed catalyst contained inside; and the slurry-bed catalyst comprises a solid catalyst and a liquid inert solvent.

The GA 40 is connected with the fixed-bed reactor 20 and the slurry-bed reactor and is a gas chromatographer (GC), where the GA 40 has a sampling tube 41 connected with the exhaust pipeline 361 and the gas outlet pipeline 22.

On using the present disclosure, a first reaction state of the four reaction states in the gas reaction device 100 has a path starting from the gas transportation pipe 10 then passing through the fixed-bed reactor 20 and ending at the GA 40. In the first reaction state, reacting gases of nitrogen ($N_2$), hydrogen ($H_2$), carbon monoxide (CO), carbon dioxide ($CO_2$) and/or a mixed gas of one of the above gases are outlet from the gas transportation pipe 10 to be received by the first gas inlet pipeline 21 of the fixed-bed reactor 20. After processing a first reaction with a fixed-bed catalyst, a first reacted gas is outlet from the gas outlet pipeline 22 of the fixed-bed reactor 20 to the GA 40. Thus, the first reacted gas is flowed through the sampling tube 41 to be analyzed for its components.

A second reaction state of the four reaction states in the gas reaction device 100 has a path starting from the gas transportation pipe 10 then passing through the slurry-bed reactor 30 and ending at the GA 40. In the second reaction state, reacting gases (as stated in the first reaction state) are outlet from the gas transportation pipe 10 to be received by the second gas inlet pipeline 31 of the slurry-bed reactor 30. After processing a second reaction with a slurry-bed catalyst, a second reacted gas having steam is outlet to the condenser 36 through the gas/liquid outlet pipeline 32 to separate gas and water. The gas separated from the second reacted gas is obtained from the exhaust pipeline 361 of the condenser 36 to be outlet to the GA 40 through the gas outlet pipeline 22. Thus, the gas separated from the second reacted gas is flowed through the sampling tube to be analyzed. Therein, the water separated from the second reacted gas is obtained from the condenser 36 and is recirculate to the slurry-bed reactor 30 through the drain line 362 for reusing, which will also do the same in a third reaction state and a fourth reaction state of the four reaction states.

The third reaction state of the four reaction states in the gas reaction device 100 has a path starting from the gas transportation pipe 10 then passing through the slurry-bed reactor 30 then the fixed-bed reactor 20 and ending at the GA 40. In the third reaction state, reacting gases (as stated in the first reaction state) are outlet from the gas transportation pipe 10 to be received by the second gas inlet pipeline 31 of the slurry-bed reactor 30. After processing a third reaction with a slurry-bed catalyst, a third reacted gas having steam is outlet to the condenser 36 through the gas/liquid outlet pipeline 32 to separate gas and water. The gas separated from the third reacted gas is obtained from the exhaust pipeline 361 of the condenser 36 to be outlet through the gas outlet pipeline 22. Then, the gas separated from the third reacted gas is recirculated to the first gas inlet pipeline 21 of the fixed-bed reactor 20 through the first connecting pipeline 34. After processing a fourth reaction with a fixed-bed catalyst, a fourth reacted gas is outlet from the gas outlet pipeline 22 of the fixed-bed reactor 20 to the GA 40. Thus, the fourth reacted gas obtained after reacted in the slurry-bed reactor 30 then the fixed-bed reactor 20 is flowed through the sampling tube 41 to be analyzed for its components.

The fourth reaction state of the four reaction states in the gas reaction device 100 has a path starting from the gas transportation pipe 10 then passing through the fixed-bed reactor 30 then the slurry-bed reactor 20 and ending at the GA 40. In the fourth reaction state, reacting gases (as stated in the first reaction state) are outlet from the gas transportation pipe 10 to be received by the first gas inlet pipeline 21 of the fixed-bed reactor 20. After processing a fifth reaction with a fixed-bed catalyst, a fifth reacted gas is obtained through the gas outlet pipeline 22 to be recirculated to the second gas inlet pipeline 31 of the slurry-bed reactor 30 through the second connecting pipeline 35. After processing a sixth reaction with a slurry-bed catalyst, a sixth reacted gas is outlet to the condenser 36 through the gas/liquid outlet pipeline 32 to separate gas and water. The gas separated from the sixth reacted gas is obtained from the exhaust pipeline 361 of the condenser 36 and is outlet through the gas outlet pipeline 22 to the GA 40 to be analyzed. Thus, the gas separated from the sixth reacted gas and obtained after reacted in the fixed-bed reactor 30 then the slurry-bed reactor 20 is flowed through the sampling tube 41 to be analyzed for its components.

To sum up, the present disclosure is a gas reaction device having four reaction states, where gas reactions are happened on a fixed bed and/or a slurry bed in four reaction states; and, thus, by using the four reaction states, gas reactions are thoroughly completed with the same catalyst, or, different reactions are completed with different catalysts for different purposes.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A gas reaction device having four reaction states, comprising:
a plurality of gas transportation pipes, said plurality of gas transportation pipes being connected with each other, each of said gas transportation pipes having at least one valve to control inlet of a reacting gas;
a fixed-bed reactor, said fixed-bed reactor being connected with said gas transportation pipe, said fixed-bed reactor having a first gas inlet pipeline and a gas outlet pipeline, said fixed-bed reactor having a catalyst bed contained inside;
wherein a fixed-bed reaction is happened with a fixed-bed catalyst and then a reacted gas is obtained after said fixed-bed reaction to be outlet through said gas outlet pipeline;
a slurry-bed reactor, said slurry-bed reactor being connected with said gas transportation pipe, said slurry-bed reactor comprising a second gas inlet pipeline, a gas/liquid outlet pipeline and a reaction housing, said second gas inlet pipeline being connected with said first gas inlet pipeline, said second gas inlet pipeline being connected with said gas outlet pipeline of said fixed-bed reactor through a first connecting pipeline and a second connecting pipeline, said gas/liquid outlet pipeline having a condenser, said condenser having an exhaust pipeline and a drain line, said exhaust pipeline being connected with said gas outlet pipeline;
wherein said slurry-bed reactor processes a slurry-bed reaction with a slurry-bed catalyst;
wherein a reacted gas having steam obtained after said slurry-bed reaction are outlet to said condenser to separate gas and water;
wherein, at last, said gas separated from said reacted gas is outlet through said gas outlet pipeline; and said water separated from said reacted gas is recirculated to said slurry-bed reactor through said exhaust pipeline;
a gas analyzer (GA), said GA being connected with said fixed-bed reactor and said slurry-bed reactor, said GA receiving and analyzing gas from a sampling tube, said gas from said sampling tube being obtained after catalyst reaction in said fixed-bed reactor and/or said slurry-bed reactor;
wherein said gas reaction device has four reaction states, comprising:
- a first reaction state, said first reaction state having a path starting from said gas transportation pipe then passing through said fixed-bed reactor and ending at said GA;
- a second reaction state, said second reaction state having a path starting from said gas transportation pipe then passing through said slurry-bed reactor and ending at said GA;
- a third reaction state, said third reaction state having a path starting from said gas transportation pipe then passing through said slurry-bed reactor then said fixed-bed reactor and ending at said GA; and
- a fourth reaction state, said fourth reaction state having a path starting from said gas transportation pipe then passing through said fixed-bed reactor then said slurry-bed reactor and ending at said GA.

2. The device according to claim 1,
wherein said fixed-bed catalyst is located on said catalyst bed of said fixed-bed reactor.

3. The device according to claim 1,
wherein said slurry-bed catalyst is located in said reaction housing of said slurry-bed reactor.

4. The device according to claim 1,
wherein said slurry-bed catalyst comprises a solid catalyst and a liquid inert solvent.

5. The device according to claim 1,
wherein said GA is a gas chromatographer (GC).

6. The device according to claim 1,
wherein said exhaust pipeline is connected with said gas outlet pipeline to connect to said sampling tube.

7. The device according to claim 1,
wherein, in said first reaction state,
reacting gases are outlet from said gas transportation pipe to be received by said first gas inlet pipeline of said fixed-bed reactor; and
a first reacted gas is outlet from said gas outlet pipeline of said fixed-bed reactor to said GA to be analyzed after processing a first reaction with a fixed-bed catalyst.

8. The device according to claim 1,
wherein, in said second reaction state,
reacting gases are outlet from said gas transportation pipe to be received by said second gas inlet pipeline of said slurry-bed reactor;
a second reacted gas having steam is outlet to said condenser through said gas/liquid outlet pipeline to separate gas and water after processing a second reaction with a slurry-bed catalyst; and
said gas separated from said second reacted gas is obtained from said exhaust pipeline of said condenser to be outlet through said gas outlet pipeline to said GA to be analyzed.

9. The device according to claim 1,
wherein, in said third reaction state,
reacting gases are outlet from said gas transportation pipe to be received by said second gas inlet pipeline of said slurry-bed reactor;
a third reacted gas having steam is outlet to said condenser through said gas/liquid outlet pipeline to separate gas and water after processing a third reaction with a slurry-bed catalyst;
said gas separated from said third reacted gas is obtained from said exhaust pipeline of said condenser to be outlet through said gas outlet pipeline;
then, said gas separated from said third reacted gas is recirculated to said first gas inlet pipeline of said fixed-bed reactor through said first connecting pipeline; and
a fourth reacted gas is outlet from said gas outlet pipeline of said fixed-bed reactor through said gas outlet pipeline to said GA to be analyzed after processing a fourth reaction with a fixed-bed catalyst.

10. The device according to claim 1,
wherein, in said fourth reaction state,
reacting gases are outlet from said gas transportation pipe to be received by said first gas inlet pipeline of said fixed-bed reactor;
a fifth reacted gas is obtained through said gas outlet pipeline to be recirculated to said second gas inlet pipeline of said slurry-bed reactor through said second connecting pipeline after processing a fifth reaction with a fixed-bed catalyst;
a sixth reacted gas is outlet to said condenser through said gas/liquid outlet pipeline to separate gas and water after processing a sixth reaction with a slurry-bed catalyst; and
said gas separated from said sixth reacted gas is obtained from said exhaust pipeline of said condenser to be outlet through said gas outlet pipeline to said GA to be analyzed.

11. The device according to claim 1,
wherein said reacting gas is selected from a group consisting of nitrogen ($N_2$), hydrogen ($H_2$), carbon monoxide (CO), carbon dioxide ($CO_2$) and a mixed gas.

* * * * *